Figure 1:
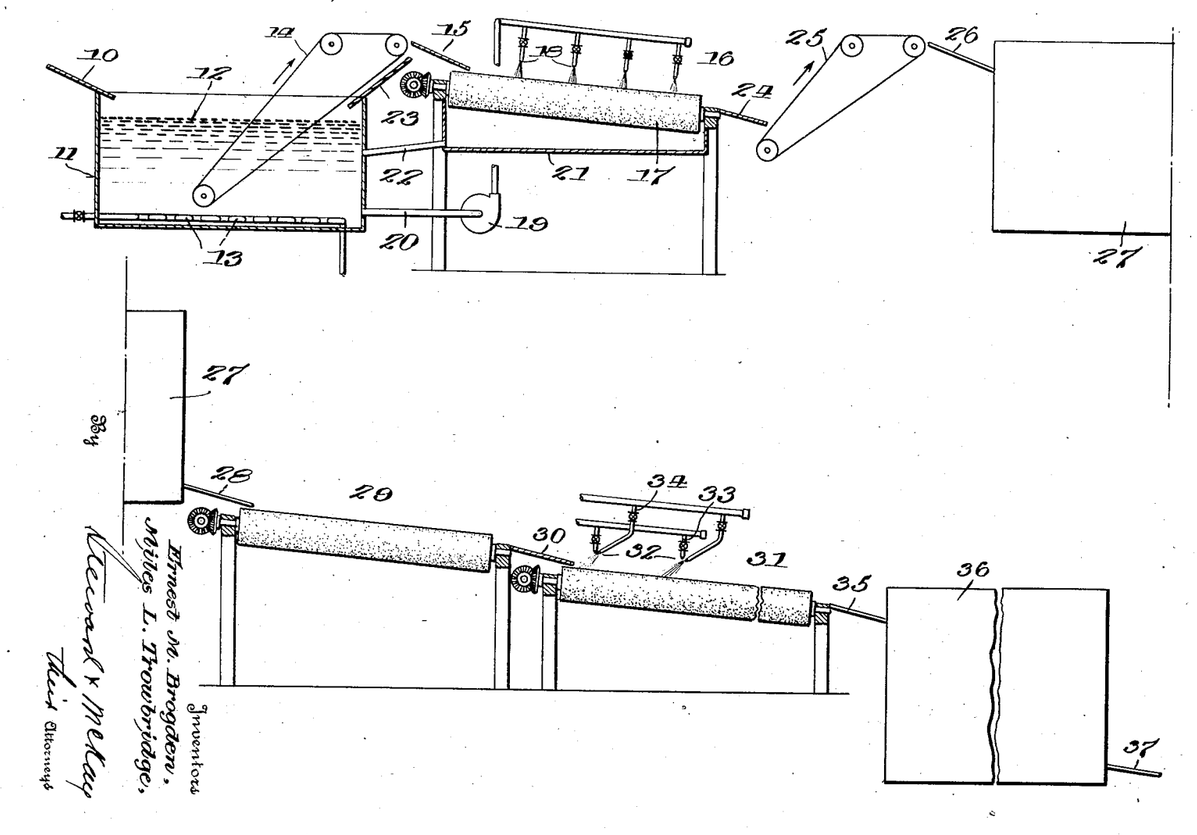

March 10, 1925.  
E. M. BROGDEN ET AL  
1,529,461  
ART OF PREPARING FRESH FRUIT FOR MARKET  
Filed Aug. 13, 1923

Inventors  
*Ernest M. Brogden,*  
*Miles L. Trowbridge,*  
By *Steward & McKay*  
*their* Attorneys Patented Mar. 10, 1925.

1,529,461

UNITED STATES PATENT OFFICE.

ERNEST M. BROGDEN, OF SANTA MONICA, AND MILES L. TROWBRIDGE, OF PALMS, CALIFORNIA.

ART OF PREPARING FRESH FRUIT FOR MARKET.

Application filed August 13, 1923. Serial No. 657,215.

*To all whom it may concern:*

Be it known that we, ERNEST M. BROGDEN and MILES L. TROWBRIDGE, citizens of the United States, residing at Santa Monica, county of Los Angeles, California, and Palms, county of Los Angeles, California, respectively, have invented certain new and useful Improvements in the Art of Preparing Fresh Fruit for Market; and we do hereby declare the following to be a full, clear, and exact description of the invention, such as will enable others skilled in the art to which it appertains to make and use the same.

This invention relates to art of preparing fresh fruit for market; and in particular it relates to processes for the treatment of citrus and other fruits in such manner that the development of molds and the like upon the fruit, and especially the development of blue mold and infection by blue mold spores, is prevented or arrested either wholly or to such large extent as greatly to prolong the marketable life of the fruit beyond what has been possible heretofore; the complete treatment most desirably also including a step of providing the fruit with a very thin film-like coating of protective material comprising a waxy substance such as paraffin; all as will more fully hereinafter appear.

The greatest present utility of the invention is in the treatment of citrus fruits such as oranges, grapefruit, lemons, tangerines, etc.; also apples and other fruits that are attacked by blue mold or the like. The invention is broad, however, and the term fruit as herein employed is to be understood as not necessarily restricted to fruit in the sense in which the word is usually employed, but is to be understood broadly as including not only fruit proper but also vegetables, such as tomatoes or the like, that can be treated to advantage in accordance with the principles of the invention to be hereinafter set forth.

For the sake of a concrete example whereby the principles of the invention may be illustrated and explained, reference will be made hereinafter more particularly to the treatment of citrus fruit, especially oranges and lemons, which are especially subject to attack and destruction by blue mold. It is a well known fact that a large part of the losses from decay in the marketing of various fruits, such as citrus fruits and apples, is attributable directly to the action of blue mold. The problem of how to suppress or control blue mold development on fruits has been the subject of extensive and careful investigation, but admittedly no thoroughly satisfactory solution of the problem has heretofore been offered. In spite of elaborate precautions taken in the handling and transportation of fruits to market, it is not uncommon for shipments of oranges and the like to arrive at marketing points showing in some cases as much as 30 to 40 per cent decay directly attributable to blue mold. The various investigations of the subject have shown that while blue mold does not ordinarily attack perfectly sound fruit that is free from bruises, cuts, thorn-pricks or punctures, the slightest surface cut or scratch affords a point of attack by providing lodgment for blue mold spores which develop with great rapidity and soon bring about complete destruction of the infected fruit. Accordingly, responsibility for decay of citrus and other fruit by the action of blue mold has been laid by investigators primarily at the door of the grower and packer. In gathering the fruit, the use of clippers to cut the fruit stems, and the dumping of the fruit into field boxes or other containers in which they are taken to the fruit packing plant, afford repeated opportunity for the fruit to be injured mechanically in one way or another. Furthermore, modern methods of packing fruit for shipment tend strongly to cause inoculation of perfectly sound fruit with blue mold spores because of the washing and brushing operations to which fruit under modern practice is subjected in the course of packing for market. A single orange afflicted with blue mold can thoroughly infect with blue mold spores the whole body of wash water with which a large quantity of fruit is washed and scrubbed; and any of such fruit that is clipper-cut, thorn-pricked, or that is in the least scratched or abraded either prior to or during the washing and scrubbing, is altogether likely to become inoculated with blue mold spores from the wash water, with the result that the blue mold gains a foothold, develops more or less rapidly according to the conditions under which the fruit is transported to market, and accomplishes partial or complete decay of the fruit before it reaches the consumer.

About the only suggestions for suppressing or retarding blue mold growth and the resultant decay that have been offered as a result of the various investigations referred to are recommendations that the growers exercise greater care in picking the fruit and getting it to the packing house; that the fruit packer frequently change the wash water employed and that he brush only very dirty fruit; and that the fruit be pre-cooled and shipped under refrigeration in order to discourage the development of blue mold. As a practical matter, it is hardly feasible commercially to gather large quantities of fruit rapidly and economically without a certain substantial percentage of the fruit being scratched, cut, pricked, or otherwise mechanically injured to a certain extent. This is bound to occur notwithstanding the highest degree of care that can be exercised in commercial practice; and as long as it does occur, the attacks by blue mold cannot possibly be prevented by methods heretofore known, because, owing to the fact that there is practically always some fruit afflicted with blue mold before gathering, blue mold spores are unavoidably present everywhere in the packing house, on the machinery, in the wash water, and floating in the air, ready to infect all fruit having the slightest surface scratch or abrasion, even if so minute as to be undiscernible by the eye. Furthermore, while refrigeration does in fact retard blue mold development to some extent, it is a highly expensive and troublesome expedient; and moreover, after the fruit has arrived at the marketing point and has been distributed to dealers for sale to the consumer, it is not feasible as a rule to keep it under refrigeration, so that large losses occur from the ravages of blue mold during this final period of the distribution to consumers, since refrigeration does not kill but merely temporarily checks to some extent the growth of blue mold or blue mold spores, decay proceeding at an accelerated rate after the fruit is removed from refrigeration.

The present applicants have discovered that by proper treatment of the fruit in the packing house it is possible to greatly reduce, and often to absolutely prevent, the growth or development of blue mold on fruit for long periods of time, and thus to materially lessen or even eliminate the heretofore unavoidable losses from decay. Moreover, it is possible to achieve these results without upsetting or greatly changing present practice so far as concerns the mechanical handling of fruit in packing houses of the modern type. Thorough practical tests of the novel processes have demonstrated conclusively that, by proceeding in accordance with the invention, blue mold development can be arrested, and fruit can be rendered immune to attack by blue mold spores, in a simple and effective manner without affecting the freshness and flavor of the fruit, the marketable life of the fruit being thus prolonged far beyond that of untreated fruit. In view of the well known persistent activity of blue mold spores even under conditions fatal to the parent mold, the importance of this achievement is obvious. In general, the process of the invention involves applying to the fruit a mold-inhibiting reagent comprising the boric acid radical, said compound being most desirably alkaline in reaction and being employed in concentration effective to render the surface of the fruit unfavorable as a medium for blue mold development. Ordinary borax ($Na_2B_4O_7+10H_2O$) has been found, after extensive investigation, to be especially potent in its retarding and inhibiting action in this connection, and this substance is considered at present to be the most desirable to employ in practicing the invention. A water solution of borax is alkaline in reaction, but is without corrosive or other deteriorating action upon fruit to which it is applied. Boric acid is not so effective as a mold-retarder as is borax; but compounds of boron, whether acid or alkaline, appear to have a specific inhibiting action upon blue mold; and hence it is not desired to limit the invention, so far as concerns compounds of boron, to the employment of an alkaline treating solution.

The method of applying the treating solution to the fruit may assume various specifically different forms, the precise details of procedure being not essential to the invention in its broader aspects. However, where it is desirable, as may often be the case, to carry out the process without changing prior practice any more than is strictly necessary, the application of the mold-retarding agent may be effected as a part of or in conjunction with the usual washing operation to which the fruit is initially subjected in its handling according to modern packing house methods, especially as most of the mold-retarding agents herein contemplated also have excellent cleansing or detergent properties. Accordingly, in the practice of the invention, the mold-retarding agent, borax in a specific instance, may be added in proper mold-inhibiting quantity directly to the wash water in the usual soaking tank into which the fruit is dumped from the field boxes as it comes from the groves. Moreover, this method has the distinct advantage that the treating solution comes in contact with the fruit initially before the latter has become wet with ordinary wash water containing no treating agent, so that the treating solution is therefore absorbed or taken up by the fruit rind or skin to a greater extent than it would be had the fruit already been thoroughly wetted. This is especially so where the fruit carries clipper-cuts or similar wounds which have dried out to a considerable extent through exposure to the air before the fruit arrives at the packing house. Such dried clipper-cuts or similar wounds are in a condition to absorb the treating solution with avidity, the exposed tissues thereby becoming impregnated therewith and this is of great advantage in getting a substantial supply of the treating reagent into the cut or lacerated tissue and rendering it immune to attack by blue mold spores not only at the very outset but also permanently. Accordingly application of the treating solution to the unwashed fruit just as it is received from the groves, as distinguished from application after the fruit has received a preliminary washing with ordinary wash water, is to be strongly recommended as best practice in carrying out the invention. It has been found also that the inhibiting action of the treating reagent is most pronounced when the solution is warm, say at 115° to 120° F., or thereabouts, and accordingly a warm solution is employed in the best embodiment of the novel method. The bath of treating solution should not be hot enough, however, to scald or cook the fruit. The strength or concentration of the treating solution may be varied considerably within reasonable limits, but our experience with all of the reagents hereinabove referred to has been that it is desirable, although not always essential that the solution contain at least about 5 per cent by weight thereof, which is equivalent to from 6 to 7 ounces per gallon of the water employed in making up the solution. In the case of borax, this is about as strong a solution as can be made up with ordinary cold water; but in operating with water warmed to 115° or 120° F., a larger percentage of borax can be held in solution and it is generally desirable to use such stronger solution. In general, a solution containing 2 per cent or more of borax may be characterized as a strong solution. A warm solution containing as much as 20 per cent of borax has proved highly effective in practice, but one containing from 10 to 15 per cent of borax has also given excellent results and in most cases proves amply concentrated for the purposes in view. In any case it is desirable that the solution contain several per cent of borax, that is, at least about 2 per cent. The solution should not contain ingredients substantially diminishing its fluidity or otherwise interfering with ready penetration of the solution into exposed rind or skin tissues.

Most desirably the application of the treating solution to the fruit includes not only passing the fruit through the soaking tank but also subjecting it to a thorough rubbing or scrubbing with the same or a similar solution in a fruit-washing machine of the usual or any suitable type. In going through the washing machine, the fruit may be sprayed with solution pumped from the soaking tank, the excess being returned to the soaking tank and used over and over again in circuit. The thorough rubbing given the fruit while wet with the borax solution is found to be very important in securing the most effective mold-inhibiting action on the fruit. Minute air bubbles trapped in the pores and crevices of the rind or skin of the fruit, and in cuts, scratches, or other wounds often so small as to be practically undiscernible, which bubbles tend to prevent intimate wetting contact of the solution with the entire surface of the fruit, are effectively dislodged by the rubbing or scrubbing treatment on the brush rolls of the washer and effective access of the treating solution to every part of the surface and exposed tissue of the fruit rind is thereby rendered more certain. Notwithstanding the fact that the fruit dumped into the soaking tank usually includes some affected with blue mold, experience with the present process has shown that the mold spores are rendered innocuous by the mold-retarder in sufficient concentration, and that application of such wash solution to fruit, even though the fruit be clipper-cut or otherwise superficially injured, does not cause the fruit to become infected. Nevertheless, the water in the soaking tank should be changed with reasonable frequency, since it becomes very dirty after large quantities of fruit have been run through it and therefore ought to be renewed occasionally as an ordinary sanitary measure. As an additional precaution, the fruit after being washed with the treating solution as described, may be sprayed with entirely fresh treating solution, but this is ordinarily unnecessary, especially where the soaking tank solution is changed reasonably often.

In handling fruit in accordance with the practice heretofore customary, the fruit upon leaving the washing machine is conveyed into and through a drier for the purpose of evaporating off the surface moisture as far as is practical. In practicing the process of the present invention, the same general procedure may be followed to advantage, the fruit after being thoroughly rubbed or scrubbed with the treating solution going directly to the drier. It is permissible within the scope of the invention, to rinse the fruit with clean water containing no treating reagent after it leaves the washing machine and before it enters the drier; but frequently the best practice, especially with weak fruit, is to allow the fruit to go directly to the drier without rinsing. The fruit, after passing through the drier, carries a substantial deposit of the solid treating reagent, borax in the specific example here in question. The stronger the treating solution employed, the greater is of course the amount of this surface deposit of white pulverulent material on the fruit. If this were allowed to remain on the fruit, the fruit might be unmarketable because of its appearance, and hence the fruit may be next treated to remove this superficial deposit. This can be accomplished most effectively by a dry brushing or rubbing of the fruit, most desirably by means of rotary cylindrical brushes of horsehair or the like operating at relatively high speed. By the action of such rotary brush means the deposit of solid treating reagent is rapidly removed from the surface of the fruit so far as the eye can determine; but as a matter of fact, and this is highly advantageous, the fruit still carries a substantial amount of the borax or other treating reagent which has been carried into the surface pores, and especially into any wounded skin tissues, by the treating solution; so that after this brushing treatment the skin or rind of the fruit is still provided with a well distributed but substantially invisible supply of mold-retarding agent sufficient to protect it for long periods against infection or attack by blue mold spores and the like. It will now be appreciated why it is better practice not to rinse the fruit with pure water after it leaves the washer and before it enters the drier. The interposed rinsing, while it would diminish or perhaps entirely eliminate the objectionable visible white deposit upon the fruit as it comes from the drier, may also reduce the amount of treating material finally remaining in and upon the surface tissues of the fruit and would thus tend to lessen the resistance of the fruit to infection.

From this point on, the handling of the fruit in further preparation for boxing and shipment may or may not involve additional preservative treatment in accordance with the principles of the invention. This depends upon whether or not the fruit is to receive an application of protective coating material for the purpose of preventing or reducing shrinkage and withering and of ensuring conservation of the original freshness and flavor of the fruit for prolonged periods of time. Generally this further treatment is highly desirable, and if the benefits of the invention are to be realized to the fullest extent, this further treatment should be carried out. It consists in applying to the fruit a normally solid protective material, especially paraffin or like waxy material, in such condition that it can be spread all over the surface of the fruit to produce an extremely thin protective film which is not noticeable except by the expert eye and does not interfere with the so-called breathing or transpiration of the fruit to an undesirable extent, but which is effective to conserve the original plumpness and freshness of the fruit as above stated.

While the process of the invention may be carried out with the aid of various types of apparatus, one desirable practical form of apparatus installation that gives satisfactory results in treating oranges, for example, is shown more or less schematically and diagrammatically in side elevation in the accompanying drawing. In using this apparatus system to carry out the new process in one of its practical embodiments, fruit just as received from the grower is delivered over chute board 10 into wash tank or soaking tank 11 containing a water solution of a mold-retarding agent of the character herein set forth, the level of the liquid in the tank being indicated at 12. It will be assumed that in this instance the solution in the tank is a 10 to 15 per cent solution of borax, and that it is maintained at a temperature around 115° to 120° F. by suitable heating means such as steam coils 13. The fruit (e. g. oranges) dumped into the soaking tank 11 floats gradually toward an elevator of any suitable type, conventionally indicated at 14, the fruit being thoroughly wetted with the treating solution en route. The elevator conducts the wet fruit up out of the tank and delivers it over chute board 15 to a fruit washer 16 which may be of usual or any suitable type. In the present instance said fruit washer is of a cylindrical brush roll type well known in the art, one of the brush rolls being indicated at 17. As the fruit passes down along the brush rolls, which may be gently inclined toward the delivery end as shown, it is sprayed with treating solution supplied through overhead spray jets 18 by a pump 19 which draws its supply through pipe 20 from the soaking tank 11. The excess solution falls from the brush rolls of the fruit washer into a drip pan 21 and is returned through pipe 22 to the soaking tank. A drip board 23 is also provided to return drip from the elevator 14 to said tank. This circulation and repeated use of the solution is desirable not only because it effects economy in the amount of treating solution used and heat units expended, but also because it helps to maintain uniformity in the concentration of the solution.

After receiving a thorough rubbing and scrubbing in the washer 16, the cleansed and treated fruit is discharged over chute board 24 to suitable conveyor means such as elevator 25 which delivers it over chute board 26 to a fruit drier of any well known or suitable type indicated conventionally at 27. In this drier, the greater part of the surface moisture is gradually evaporated from the fruit, although it is not essential to success of the process that this drying be perfectly complete. Where the treating solution is fairly strong, however, it is desirable from the standpoint of the final appearance of the fruit, that sufficient drying occur to enable ready removal of the superficial excess of the mold retarding agent by the subsequent rubbing treatment. From the drier, the fruit passes over chute board 28 to suitable brushing and rubbing means which may desirably be of the brush roll type indicated generally at 29. While this apparatus may be a brush roll polisher such as is common in the art, better results are obtainable by the use of a novel form disclosed and claimed in the application of E. M. Brogden, Ser. No. 653,227, filed July 23, 1923. In apparatus 29, the fruit is thoroughly rubbed by the brushing surfaces of the rolls which are advantageously of horsehair and are desirably driven at relatively high speed, the white powdery deposit of borax left on the surface of the fruit after drying being dusted off by these rolls. The mechanism should be of such character and design as to ensure turning the fruit on various axes so that all portions of its surface may be subjected to effective brushing and rubbing.

From the brush roll mechanism 29, the fruit rolls down over chute board 30 to another brush roll mechanism indicated generally at 31 above which near the upper or receiving end is located suitable spraying means such as air brushes indicated conventionally at 32, said air brushes serving to direct fluid coating material in atomized condition down upon the fruit as it enters the unit 31. Most desirably this coating material comprises paraffin and a solvent thereof thoroughly intermingled to provide a thinly fluid mixture that can be spread in an extremely thin film over the fruit by the action of the brush rolls. Both the liquid supply jet pipes 33 and the cooperating compressed air jets 34, which comprise the air brush devices, are suitably valved, as shown, so that the proper quantity of coating material projected upon the fruit entering unit 31 can be accurately adjusted to the optimum amount. An especially desirable solvent for use in the waxy coating material or composition before mentioned is a refined light mineral oil of the kerosene type which may be obtained in the distillation of petroleum. In a typical instance this distillate may have a specific gravity of about 0.810, a flash point of about 149° F., and an approximate boiling range of 360° to 486° F. The waxy material employed may desirably constitute from 5 to 20 per cent of the composition.

Another satisfactory coating mixture of suitable fluent character may consist of 1 part of paraffin wax, and 2 parts of a highly refined low viscosity white mineral oil, which is odorless, tasteless and colorless. Such an oil may, for example, be of about 0.840 specific gravity, and have a viscosity of 70–73 seconds at 100° F, a flash point of 340°–350° F., and a boiling range approximating 600° to 745° F.

The wax-containing mixtures or compositions hereinabove disclosed are not claimed herein, the same constituting the subject matter of prior copending applications of one of the present applicants.

After receiving a small amount of coating material from the air brushes upon entering brush roll unit 31, the fruit continues to pass down the brush roll runway or runways and is subjected to a very thorough rubbing by the horsehair surfaces of the brush rolls which are rotated at sufficiently high speed to ensure spreading out the small quantity of coating material applied to each fruit into a protective film coating of microscopic thinness. The brush rolls of unit 31 may advantageously be quite long in order that, after receiving the initial application of coating material by the air brushes at the receiving end, the fruit then travels a comparatively long distance in contact with the rapidly moving brushing surfaces, whereby the brushing action is thoroughly effective to produce a protective coating of the desired extreme thinness.

After leaving unit 31, the fruit passes over chute board 35 and travels through fruit drier 36, where it is subjected to currents of air, most desirably suitably warmed. This treatment results in the evaporation of residual moisture upon the surface of the fruit and also of at least a part of the hydrocarbon solvent, if a volatile solvent was employed in the waxy coating composition.

Leaving the drier over chute board 37, the fruit then goes to the graders and sizers and is ready to be shipped in the usual manner with the exception, however, that precooling and refrigeration are not necessary, provided the cars in which the fruit is shipped are reasonably well ventilated.

Fruit treated with any of the solutions hereinabove described should be subjected to the action of the solution for a sufficient time to ensure thoroughly effective mold-inhibiting action. Where a warm treating solution is used, it is usually sufficient for the fruit to remain two or three minutes in the soaking tank before it goes through the washer; but where cooler and less concentrated solutions are used, a longer soaking period is advantageous. As before pointed out, it is sometimes feasible to rinse the fruit with plain water after subjecting it to the action of the treating solution and before it enters the drier, and in the case of citrus fruits particularly, this can be done especially during the early part of the shipping season when the fruit is firm and in exceptionally good condition. However, where the fruit is "weak," as it commonly is during the latter part of the season when riper fruit is being picked and shipped, the interposed rinsing is sometimes not to be recommended. The procedure involving rinsing of the fruit after treatment with the mold-inhibiting solution is not specifically claimed herein, this particular procedure constituting in part the subject matter of a copending application of one of the present applicants.

In the foregoing disclosure of the principles of the invention, reference has been made more particularly to blue mold as a source or cause of decay. Such reference to blue mold is to be taken, not as restrictive, but as generic and as intended, both in the specification and in the claims, to cover not only blue mold but all kindred rot and decay organisms and diseases generally amenable to treatment in accordance with the invention, to which fruit is or may be susceptible and by which it may be damaged under the conditions prevailing in packing and marketing.

What is claimed is:

1. In the preparation of fresh fruit for market, the process which comprises subjecting fruit to the action of an aqueous solution of a compound comprising the boric acid radical having a retarding action on the development of blue mold, the fluidity, strength and temperature of the treating solution, and the duration of the treatment, being such that exposed rind or skin tissues of the fruit are effectively impregnated with said compound and rendered resistant to blue mold decay, while at the same time the fruit is not scalded nor is its freshness or edibility otherwise substantially impaired.

2. In the preparation of fresh fruit for market, the process which comprises subjecting fruit to the action of an aqueous solution of an alkali metal borate, the fluidity, strength and temperature of the treating solution, and the duration of the treatment, being such that exposed rind or skin tissues of the fruit are effectively impregnated with said borate and rendered resistant to blue mold decay, while at the same time the fruit is not scalded nor is its freshness or edibility otherwise substantially impaired.

3. In the preparation of fresh fruit for market, the process which comprises subjecting fruit to the action of an aqueous solution of borax, the fluidity, strength and temperature of the treating solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired.

4. In the preparation of fresh fruit for market, the process which comprises subjecting fruit to the action of an aqueous solution containing at least 5 per cent of borax, the fluidity, strength and temperature of the treating solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired.

5. In the preparation of fresh fruit for market, the process which comprises subjecting fruit to the action of an aqueous solution containing at least 5 per cent of borax, said solution being at a temperature above 100° F. and most desirably approximating 115° to 120° F., the fluidity of the solution and the duration of the treatment being such that exposed rind or skin tissues of the fruit are effectively impregnated with borax and rendered resistant to blue mold decay, while at the same time the freshness and edibility of the fruit remain substantially unimpaired.

6. In the preparation of fresh fruit for market, the process which comprises applying to fruit an aqueous solution of a solid mold-retarding agent comprising borax, and allowing a sufficient quantity of said solution to evaporate upon the surface of the fruit to leave thereon a substantial deposit of said solid agent.

7. In the preparation of fresh fruit for market, the process which comprises soaking and rubbing fruit for at least 2 minutes with a warm solution of an alkaline mold-retarder comprising borax, and allowing the fruit to dry without rinsing off the liquid of said bath.

8. In the preparation of fresh fruit for market, the process which comprises first soaking the fresh fruit for several minutes with a water solution of a mold-retarding agent comprising borax, and then rubbing the fruit with such solution whereby to ensure intimate wetting contact of the solution with the entire surface of the fruit.

9. In the preparation of fresh citrus fruit for market, the process which comprises soaking fresh citrus fruit with an aqueous solution of borax for at least 2 minutes, and thereafter removing surface moisture from the fruit, the fluidity, strength and temperature of the solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired.

10. In the preparation of fresh citrus fruit for market, the process which includes the steps of soaking unwashed fresh citrus fruit as it comes from the grove in an aqueous solution of borax heated to above the temperature of the surrounding atmosphere but insufficiently hot to scald or cook the fruit, rubbing the fruit while it is still wet with borax solution, and thereafter removing surface moisture from the fruit, the fluidity and strength of the treating solution, and the duration of treatment, being such that exposed rind or skin tissues are effectively impregnated with borax and rendered resistant to blue mold decay, while at the same time the freshness and edibility of the fruit are not substantially impaired.

11. In the preparation of fresh citrus fruit for market, the process which includes the steps of soaking unwashed fresh citrus fruit as it comes from the grove in a body of wash water containing dissolved therein a mold-inhibiting percentage of borax, then removing the fruit from said body of wash water and rubbing it thoroughly while showering upon it more of said wash water, the excess of wash water thus showered upon the fruit being returned to the aforesaid body of wash water for re-use.

12. In the preparation of fresh citrus fruit for market, the process of controlling blue mold decay which includes the step of cleansing the unwashed fruit as it comes from the grove by means of wash water containing at least 5 per cent of borax.

13. In the preparation of fresh citrus fruit for market, the process of controlling blue mold decay which includes the step of cleansing the unwashed fruit as it comes from the grove by means of a mold-inhibiting solution of borax, the fluidity, strength and temperature of the solution, and the duration of the treament, being such that exposed rind or skin tissues of the fruit are effectively impregnated with borax and rendered resistant to blue mold decay, while at the same time the fruit is not scalded nor is its freshness or edibility otherwise substantially impaired.

14. In the preparation of fresh citrus fruit for market, the process which comprises advancing the fresh fruit in a traveling stream over a predetermined path, maintaining the fruit wet with a warm solution of borax for a period of at least 2 minutes during such travel, the fluidity, strength and temperature of the solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired, and further treating the fruit at subsequent stages in its travel to effect removal of surface moisture and surface excess of borax, while avoiding removal of borax to such an extent as would destroy resistance of the fruit to blue mold decay.

15. In the preparation of fresh fruit for market, the process which comprises advancing fresh fruit in a traveling stream over a predetermined path, applying to said fruit as it travels over a portion of said path a strong solution of borax while causing the fruit to turn over and over, subjecting the fruit as it travels over a subsequent portion of said path to a drying treatment for removal of surface moisture therefrom, and then rubbing the fruit.

16. In the preparation of fresh fruit for market, the process which comprises impregnating exposed rind or skin tissues of fresh fruit with a compound comprising the boric acid radical to an extent sufficient to render such fruit substantially immune to attack by blue mold.

17. In the preparation of fresh fruit for market, the process which comprises impregnating exposed rind or skin tissues of fresh fruit with a compound comprising borax to an extent sufficient to render such fruit substantially immune to attack by blue mold.

18. In the preparation of fresh fruit for market, the process of protecting the same against blue mold which includes the step of maintaining fresh fruit wet for at least 2 minutes with an aqueous solution containing between 5 and 15 per cent of borax, the temperature of said solution being above 100° F. but being insufficiently high to injure the fruit.

19. In the preparation of fresh fruit for market, the process which comprises contacting the entire surface of fresh fruit with a solution containing borax in sufficient concentration to exert pronounced mold-inhibiting action, and thereafter applying to the fruit so treated a thin, filmlike protective coating comprising waxy material.

20. In the preparation of fresh fruit for market, the process which comprises contacting the entire surface of fresh fruit with an aqueous solution containing a compound comprising the boric acid radical having a retarding action on the development of blue mold, the fluidity, strength and temperature of the treating solution, and the duration of the treatment, being such that exposed rind or skin tissues of the fruit are effectively impregnated with said compound and rendered resistant to blue mold decay, while at the same time the fruit is not scalded nor is its freshness or edibility otherwise substantially impaired, and thereafter applying to the fruit so treated a thin, film-like protective coating comprising waxy material.

21. In the preparation of fresh citrus fruit for market, the process which comprises maintaining said fruit wet with an aqueous solution of borax for a period of at least 2 minutes, the fluidity, strength and temperature of the borax solution, and the duration of the treatment therewith, being such that exposed rind or skin tissues of the fruit are effectively impregnated with borax and rendered resistant to blue mold decay, while at the same time the fruit is not scalded nor is its freshness or edibility otherwise substantially impaired, drying the surface of the fruit, and providing it with a thin, film-like protective coating comprising waxy material.

22. In the preparation of fresh citrus fruit for market, the process which comprises maintaining said fruit wet with a strong borax solution for a period of at least 2 minutes, the fluidity, strength and temperature of the borax solution, and the duration of the treatment therewith, being such that exposed rind or skin tissues of the fruit are effectively impregnated with borax and rendered resistant to blue mold decay, while at the same time the fruit is not scalded nor is its freshness or edibility otherwise substantially impaired, removing from the surface of the fruit moisture and unnecessary excess of borax while avoiding removal of so much borax as to destroy resistance of the fruit to blue mold decay, and rubbing the fruit with waxy material to provide it with a thin, film-like protective coating.

23. Fresh fruit of which the rind or skin carries a non-poisonous mold-inhibiting compound comprising the boric acid radical, the amount of said compound present being very small but sufficient to render the fruit resistant to blue mold decay.

24. Fresh fruit of which the rind or skin carries borax in amount that is very small but sufficient to render the fruit resistant to blue mold decay.

25. Fresh citrus fruit of which the rind or skin carries a non-poisonous mold-inhibiting compound comprising the boric acid radical, the amount of said compound present being very small but sufficient to render the fruit resistant to blue mold decay.

26. Fresh citrus fruit of which the rind or skin carries borax in amount that is very small but sufficient to render the fruit resistant to blue mold decay.

27. Fresh citrus fruit as defined in claim 25, further characterized by the fact that its surface is provided with a thin film-like protective coating of waxy material.

28. Fresh citrus fruit as defined in claim 26, further characterized by the fact that its surface is provided with a thin film-like protective coating comprising paraffin.

In testimony whereof we hereunto affix our signatures.

ERNEST M. BROGDEN.
MILES L. TROWBRIDGE.

DISCLAIMER 1,529,461.—*Ernest M. Brogden*, Santa Monica, and *Miles L. Trowbridge*, Palms, Calif. ART OF PREPARING FRESH FRUIT FOR MARKET. Patent dated March 10, 1925. Disclaimer filed August 3, 1931, by the assignee, *Brogdex Company*.

Hereby enters this disclaimer to said claims 1, 2, 3, 4, 5, 6, 7, 9, 14, 15, 16, 17, 18, 23, 24, 25, and 26 of said Letters Patent which are in the following words, to wit:

"1. In the preparation of fresh fruit for market, the process which comprises subjecting fruit to the action of an aqueous solution of a compound comprising the boric acid radical having a retarding action on the development of blue mold, the fluidity, strength and temperature of the treating solution, and the duration of the treatment, being such that exposed rind or skin tissues of the fruit are effectively impregnated with said compound and rendered resistant to blue mold decay, while at the same time the fruit is not scalded nor is its freshness or edibility otherwise substantially impaired.

"2. In the preparation of fresh fruit for market, the process which comprises subjecting fruit to the action of an aqueous solution of an alkali metal borate, the fluidity, strength and temperature of the treating solution, and the duration of the treatment, being such that exposed rind or skin tissues of the fruit are effectively impregnated with said borate and rendered resistant to blue mold decay, while at the same time the fruit is not scalded nor is its freshness or edibility otherwise substantially impaired.

"3. In the preparation of fresh fruit for market, the process which comprises subjecting fruit to the action of an aqueous solution of borax, the fluidity, strength and temperature of the treating solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired.

"4. In the preparation of fresh fruit for market, the process which comprises subjecting fruit to the action of an aqueous solution containing at least 5 per cent of borax, the fluidity, strength and temperature of the treating solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired.

"5. In the preparation of fresh fruit for market, the process which comprises subjecting fruit to the action of an aqueous solution containing at least 5 per cent of borax, said solution being at a temperature above 100° F. and most desirably approximating 115° to 120° F., the fluidity of the solution and the duration of the treatment being such that exposed rind or skin tissues of the fruit are effectively impregnated with borax and rendered resistant to blue mold decay, while at the same time the freshness and edibility of the fruit remain substantially unimpaired.

"6. In the preparation of fresh fruit for market, the process which comprises applying to fruit an aqueous solution of a solid mold-retarding agent comprising borax, and allowing a sufficient quantity of said solution to evaporate upon the surface of the fruit to leave thereon a substantial deposit of said solid agent.

"7. In the preparation of fresh fruit for market, the process which comprises soaking and rubbing fruit for at least 2 minutes with a warm solution of an alkaline mold-retarder comprising borax, and allowing the fruit to dry without rinsing off the liquid of said bath."

"9. In the preparation of fresh citrus fruit for market, the process which comprises soaking fresh citrus fruit with an aqueous solution of borax for at least 2 minutes, and thereafter removing surface moisture from the fruit, the fluidity, strength and temperature of the solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired."

"14. In the preparation of fresh citrus fruit for market, the process which comprises advancing the fresh fruit in a traveling stream over a predetermined path, maintaining the fruit wet with a warm solution of borax for a period of at least 2 minutes during such travel, the fluidity, strength and temperature of the solution, and the duration of the treatment, being such that exposed rind or skin tissues of the fruit are effectively impregnated with borax and rendered resistant to blue mold decay, while at the same time the fruit is not scalded nor is its freshness or edibility otherwise substantially impaired, and further treating the fruit at subsequent stages in its travel to effect removal of surface moisture and surface excess of borax, while avoiding removal of borax to such an extent as would destroy resistance of the fruit to blue mold decay.

"15. In the preparation of fresh fruit for market, the process which comprises advancing fresh fruit in a traveling stream over a predetermined path, applying to said fruit as it travels over a portion of said path a strong solution of borax while causing the fruit to turn over and over, subjecting the fruit as it travels over a subsequent portion of said path to a drying treatment for removal of surface moisture therefrom, and then rubbing the fruit.

"16. In the preparation of fresh fruit for market, the process which comprises impregnating exposed rind or skin tissues of fresh fruit with a compound comprising the boric acid radical to an extent sufficient to render such fruit substantially immune to attack by blue mold.

"17. In the preparation of fresh fruit for market, the process which comprises impregnating exposed rind or skin tissues of fresh fruit with a compound comprising borax to an extent sufficient to render such fruit substantially immune to attack by blue mold.

"18. In the preparation of fresh fruit for market, the process of protecting the same against blue mold which includes the step of maintaining fresh fruit wet for at least 2 minutes with an aqueous solution containing between 5 and 15 per cent of borax, the temperature of said solution being above 100° F. but being insufficiently high to injure the fruit."

"23. Fresh fruit of which the rind or skin carries a non-poisonous mold-inhibiting compound comprising the boric acid radical, the amount of said compound present being very small but sufficient to render the fruit resistant to blue mold decay.

"24. Fresh fruit of which the rind or skin carries borax in amount that is very small but sufficient to render the fruit resistant to blue mold decay.

"25. Fresh citrus fruit of which the rind or skin carries a non-poisonous mold-inhibiting compound comprising the boric acid radical, the amount of said compound present being very small but sufficient to render the fruit resistant to blue mold decay.

"26. Fresh citrus fruit of which the rind or skin carries borax in amount that is very small but sufficient to render the fruit resistant to blue mold decay."

[*Official Gazette August 25, 1931.*]